Feb. 16, 1971     A. J. JANIK     3,562,827
SELF-OPENING DIE HEAD
Filed June 27, 1968
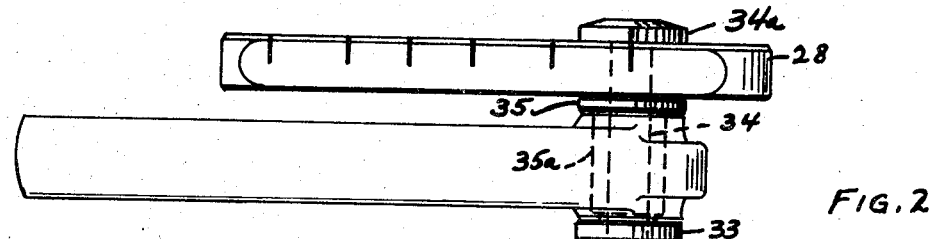
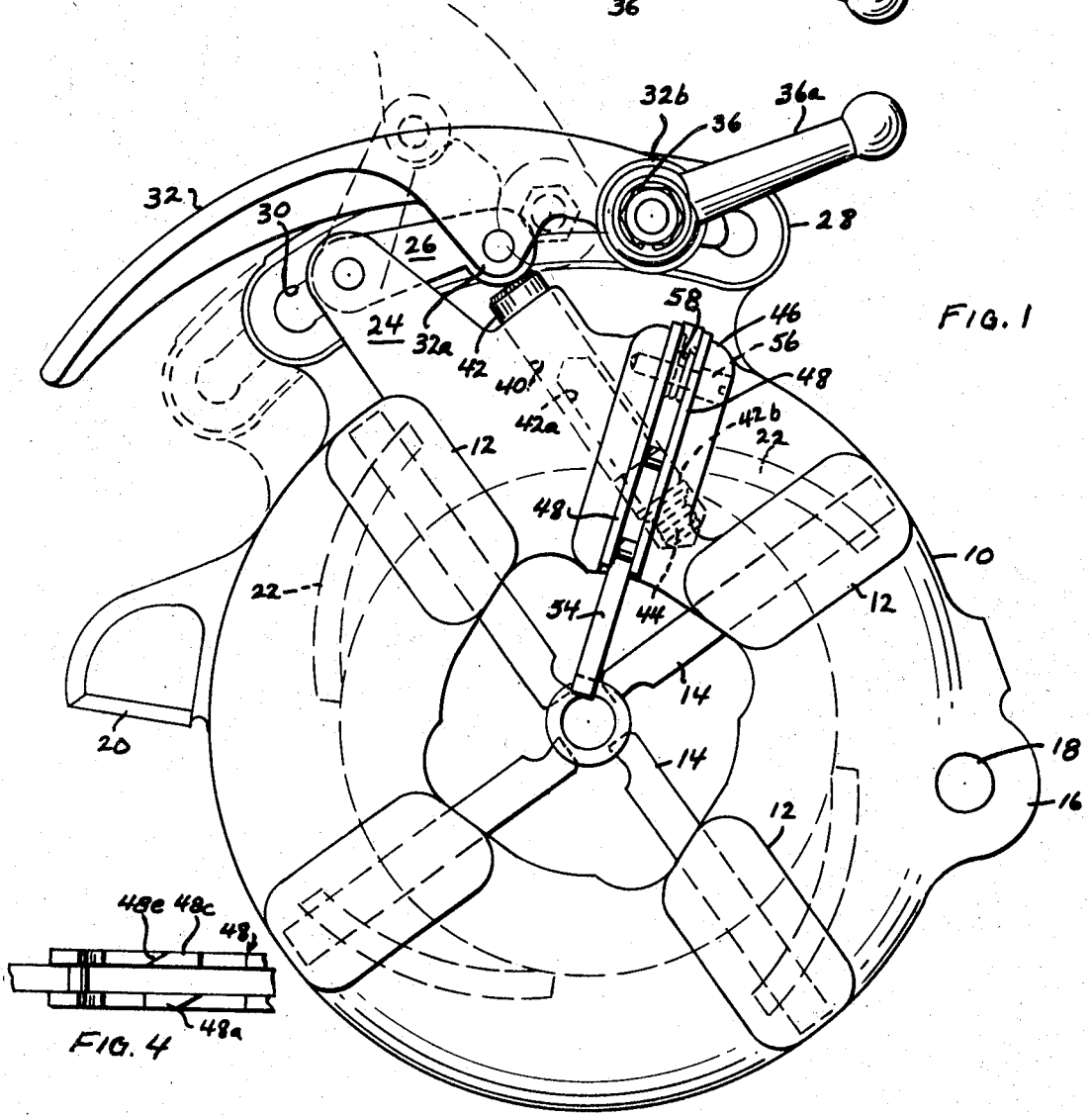
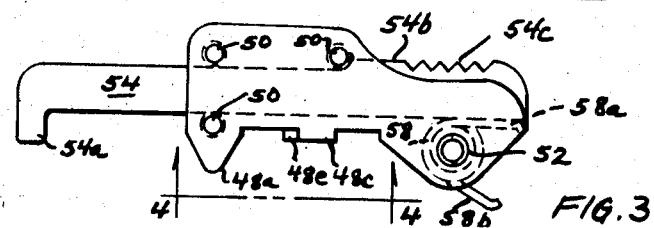
INVENTOR.
Anton J. Janik
BY
J. D. Douglas
His atty.

United States Patent Office 3,562,827
Patented Feb. 16, 1971

3,562,827
SELF-OPENING DIE HEAD
Anton J. Janik, North Ridgeville, Ohio, assignor to Emerson Electric Co., St. Louis, Mo., a corporation of Missouri
Filed June 27, 1968, Ser. No. 740,634
Int. Cl. B23g 5/10, 5/12
U.S. Cl. 10—99                     4 Claims

ABSTRACT OF THE DISCLOSURE

A die head which mounts chasers for cutting threads has a scroll plate for advancing and retracting the chasers movable relative to the chaser holding portion. The two parts are connected by a toggle linkage which is operated by a lever to cause the relative movement between the die head parts to retract and advance the chasers. A spring plunger is carried by one of the head parts disposed to engage the center joint of the toggle linkage and to move the loggle linkage to an open position to retract the chasers. Lock means for the plunger includes a guide means pivotally mounted on the one die head part and arranged for locking engagement with the plunger. A trigger slide in the guide means may be moved to a position to be engaged by a pipe being threaded and release the lock means. It may be slid to one side where it is not engaged by the pipe when a manual operation is desired.

---

This invention relates to improvements in self-opening die heads for threading pipe or rods.

In the threading of pipe, and particularly where a power driven pipe threading machine is used such as disclosed in U.S. Patent No. 2,768,550, it is desirable to automatically withdraw the chasers from the pipe when the desired amount of threading has been effected. This provides uniformity of threading of the pipes; prevents making too many threads on the pipe and makes it unnecessary to reverse the machine to remove the pipe from the die head.

It has been proposed to provide means which is operated by the pipe to automatically "open" the die head., i.e., withdraw the chasers from threading engagement with the pipe, when a predetermined number of threads have been cut. One such means is disclosed in Pat. No. 3,142,076.

It is also desirable that the means be economical to construct and simple to operate, requiring as little manual adjustment as is possible to simplify the operation.

The present invention includes a die head having a forward portion which is carried on a support such as a carriage supported on ways as shown in Pat. 2,768,550 and carries a set of chasers. Immediately in back of and rotatably mounted on the forward portion is a rear portion which carries a scroll plate having lands in engagement with chasers which, when rotated relative to the forward part, moves the chasers radially inward or outward.

The forward and rearward parts of the head are moved relative to each other by a toggle linkage connected between the parts which can be operated manually by a handle, one part of which also forms one of the links. A spring pressed plunger carried by the forward head part is disposed opposite to the central connection for the toggle linkage and, when released, operates the toggle linkage to cause the chasers to be retracted. The plunger is held retracted by a trigger mechanism which is engaged by the pipe after a certain number of threads are cut, to release the plunger. The trigger mechanism can be moved to a retracted position where it will not be engaged by the pipe end, eliminating the automatic opening feature.

Still other advantages of the invention and the invention itself will become more apparent from the following description of an embodiment thereof, which description is illustrated by the accompanying drawings and forms a part of this specification.

In the drawings:

FIG. 1 is an end elevational view of the die head of the invention;

FIG. 2 is a top view of the toggle connection for the die head part;

FIG. 3 is a side view of the trigger slide mechanism removed from the die head; and FIG. 4 is a fragmentary view taken from the line 4—4 of FIG. 3.

Referring now to the drawings, throughout which like parts are designated by like reference characters, as best shown in FIG. 1, the die head is more or less conventional, except for the portions which carry out the invention, and includes a forward portion 10 having four radially extending bosses 12 that are provided with ways in which the chasers 14 are slidably disposed. As stated, the die head illustrated is adapted for use on a power machine of the character shown in Pat. 2,768,550 and to that end is provided with an ear 16 on the right side which mounts a pin 18, whereby it may be pivotally mounted on a suitable carriage. At the other opposite side an ear 20 is provided which engages with a seat on the carriage.

Back of the forward portion and suitably mounted thereon for reciprocal or rotary motions relative to the front part is the rear portion which carries the lands 22 which engage with and control the in and out movement (closing and opening) of the chasers.

The front portion, at the top left of center, is provided with an outwardly extending apertured ear 24 to which a first link 26 of the toggle linkage is pivoted. The back portion of the head is provided with an outwardly extending elongated arcuate boss 28 behind the ear 24 having an arcuate slot 30. The second link of the toggle linkage comprises an arcuate handle 32 having a first apertured boss 32a which is pivotally connected to the free end of the first link 26, and has an apertured end boss 32b by which it is adjustably connected to the arcuate boss 28 by means of a bolt 34. The bolt has a head 34a disposed on the back side of the boss 28, and a flattened shank extending through the slot 30 with a round threaded shank portion extending through the aperture in the end boss 32b upon which a nut 36 is disposed. A handle 36a is disposed on the nut, being captured by a spring ring 36b disposed in a groove in the nut. The assembly is shown in FIG. 2 with the nut 36 loose prior to tightening.

The construction of the connecting bolt 34 is such that the head may be tightened securely to the arcuate boss 28 but leaving the lever 32 and its boss 32b free to rotate on the bolt. To this end a flanged sleeve 35 is disposed with the flange against the boss 28, the end of the flange sleeve 35a abutting the washer 33. Thus the entire toggle linkage together with the front part of the head is held in a fixed adjusted position relative to the rear part. The back part can be moved to any position, within the limits of the arcuate slot 30 and clamped by the handle 36, to move the position of the lands 22 and adjust the chaser positions for cutting of threads on pipes (or bolts) of different diameter. When clamped in adjusted position the toggle lever 32 is still free to rotate about the pivot bolt 34.

The front portion 10 is formed to provide a tangentially extending blind cylindrical recess 40, the center line of which extends through the center joint of connection of the link 26 with the handle link 32. In the recess there is disposed a cylindrical toggle operating plunger 42. The plunger has a blind hole 42a in which a spring 44 is disposed, one end engaging with the bottom of the hole 42a and the other with the bottom of the recess 40, to press the plunger outwardly against the toggle joint. The plunger is also formed with a circumferential lock engaging groove 42b near its bottom end.

Means for holding the toggle operating plunger retracted and arranged to be released from its holding engagement with the plunger is provided. The front housing 10 is provided with a substantially radially extending boss 46 which intersects the recess 40 near its bottom end. The walls of the channel form a guideway for a trigger assembly which holds the plunger retracted.

As best shown in FIGS. 3 and 4, the trigger assembly includes a frame consisting of a pair of side plates 48 held in spaced relation to each other by shouldered rivets 50 and a hollow shoulder pivot rivet 52. The spacing of the plates and the positioning of the rivets is such as to form a guide for a trigger slide 54. The bottom of the slide rests on the lower of the rivets 50 and 52 and the top is under the top rivets 50. It includes a body of rectangular cross section having a downwardly projecting end part 54a at one end, and an enlarged part 54b at the other end, the top of which is provided with a serrated upper finger grip surface 54c. Longitudinal movement of the slide in the frame is limited by the part 54a which engages with a bottom rivet 50 and the shoulder formed by the beginning of the enlarged part 54b which engages with the right top spacer rivet 50.

The sides of the frame parts are provided with downwardly facing triangular projections which engage with the bottom of the channel formed by the spaced walls 46a, the projections being indicated at 48a. The other ends of the frame parts are provided with downwardly extending portions 48b in which the hollow spacer rivet 52 is disposed and the entire trigger assembly is held between the walls 46a on a pivot pin 56. A spring 58 has a helical body disposed around the pivot rivet 52 and with one arm 58a frictionally pressed against the bottom of the trigger slide 54 and the other arm 58b under tension against the bottom wall of the groove formed by the walls 46a in the boss 46. The entire trigger assembly is thus pivotally held between the walls 46a and spring pressed with the points 48a bottomed in the groove. The frame sides 48 are provided with downwardly extending lugs 48c and 48d. The lug 48c has a slanting surface 48e, this surface being at such an angle that it is parallel to the walls of the groove 42b of the plunger, and the lugs are disposed between the walls of the groove 42b of the plunger when in locking engagement with the plunger with the surface 48e engaging with the wall of the groove nearest the inner end of the plunger. The trigger slide 54 may be moved inwardly toward the center of the die where it will be engaged by a pipe during the threading operation or outwardly clear of the pipe against the friction of the spring 58.

The operation of the device is as follows:

The clamp handle 36 is loosened and the rear part of the die head moved until it is set to the required position for threading a pipe or bolt of the desired size, as indicated by the markings on the arcuate boss 28, after which it is tightened. The trigger slide is moved toward the axis of the die head into position where it is opposite the end of the pipe. The pipe being rotated, the head is moved toward the pipe and starts the cutting of the threads.

When ½ or ¾ inch pipe are being threaded, the slide is moved to the point where the pipe will engage with the point 54a of the slide. For pipe of larger size the point 54a will be inward of the pipe wall and the pipe will engage with the slide inwardly of the part 54a. Thus the smaller sizes of pipe will automatically be threaded for less lineal distance than the larger sizes.

As the threading proceeds the pipe moves through the chasers until it contacts the trigger slide 54. This causes the slide assembly to move about its pivot 52 against the pressure of the spring 58. Eventually the plunger engaging seats 48e of the assembly is withdrawn from engagement with the wall of the groove 42b of the plunger 42 and the spring 44 forces the plunger outward against the center joint of the toggle, causing the toggle levers to pivot outwardly, decreasing the distance between the ends of the toggle and causing the back scroll plate section to be rotated, withdrawing the chasers from engagement with the pipe. This occurs suddenly with a snap action.

If another pipe is to be threaded, after removal of the first pipe and if it is the same size, all that needs to be done is to move the toggle handle 32 to its closed position. This automatically moves the center of the toggle joint past dead center and forces the plunger 42 back to its retracted and into locked position with the slide assembly.

As can be seen, the slide 54 is easily moved to any position for the particular size of pipe being threaded. It can also be moved to a retracted position so far that it will not be engaged by a pipe or bolt which enables longer threads to be cut as on a bolt. At this time the opening is manually effected by the handle 32.

It should particularly be noted that the device is economical to construct. That it is simple to operate, its operation being controlled simply by moving the trigger slide 54 and requires no extra levers to be set for an operative or inoperative position.

Having thus described the invention in an embodiment thereof, it will be appreciated that numerous and extensive departures may be made therefrom without departing from the spirit of the invention as defined by the appended claims.

I claim:

1. A die head including a first chaser carrying member carrying chasers and a second chaser controlling member, toggle means interconnecting the first and second members, and spring pressed means carried by one of said members and arranged to engage the toggle means to release the toggle and cause relative movement between the two members to retract the chasers, said spring pressed means having a seat, the improvement which comprises means for engaging with said seat and holding said spring pressed means in a retracted position comprising a slide holder pivotally mounted on the chaser carrying member on an axis transverse to the axis of the die head and having means for engaging the seat in the spring pressed means, and a slidable member disposed in said slide holder and slidable into and out of the path of an article being threaded and guide means on the slide holder in guiding engagement with the slidable member.

2. A device as described in claim 1, wherein said chaser carrying member is provided with a pair of radially extending parallel bosses forming a channel and said slide holder is disposed between the bosses.

3. A device as described in claim 2, wherein spring means is provided for said slide holder and has frictional engagement with said slidable member, and continuously holds said slide holder toward the bottom of the channel formed by the bosses.

4. A device as described in claim 3, wherein the seat in the said spring pressed means is provided by a pair of spaced walls defining a groove and the means on said holder includes a surface projecting parallel to a wall of the groove engaged with a wall of the groove of the spring pressed means.

References Cited
UNITED STATES PATENTS

| | | | |
|---|---|---|---|
| 873,334 | 12/1907 | Westrip et al. | 10—96 |
| 1,701,846 | 2/1929 | Harrison | 10—96 |
| 3,142,076 | 7/1964 | Brandt | 10—96 |

CHARLES W. LANHAM, Primary Examiner

E. M. COMBS, Assistant Examiner